(12) United States Patent
Duong (10) Patent No.: US 10,578,125 B2
(45) Date of Patent: Mar. 3, 2020

(54) COMPRESSOR STATOR VANE WITH LEADING EDGE FORWARD SWEEP

(71) Applicant: PRATT & WHITNEY CANADA CORP., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 390 days.

(21) Appl. No.: 15/361,050

(22) Filed: Nov. 24, 2016

(65) Prior Publication Data

US 2018/0142703 A1 May 24, 2018

(51) Int. Cl.
*F04D 29/54* (2006.01)
*F01D 5/14* (2006.01)

(52) U.S. Cl.
CPC ............. *F04D 29/542* (2013.01); *F01D 5/14* (2013.01); *F01D 5/141* (2013.01)

(58) Field of Classification Search
CPC ........... F04D 29/542; F01D 5/141; F01D 5/14
See application file for complete search history.

(56) References Cited

U.S. PATENT DOCUMENTS

| | | | |
|---|---|---|---|
| 6,755,612 B2 | 6/2004 | Shahpar et al. | |
| 8,517,677 B2 | 8/2013 | Wood et al. | |
| 2008/0131272 A1* | 6/2008 | Wood | F01D 5/142 |
| | | | 415/199.5 |
| 2014/0212282 A1 | 7/2014 | Cornelius et al. | |
| 2016/0076548 A1* | 3/2016 | Reynolds | F01D 5/141 |
| | | | 415/148 |

FOREIGN PATENT DOCUMENTS

| | | |
|---|---|---|
| EP | 1930598 | 6/2008 |
| EP | 1939399 | 7/2008 |
| EP | 2990601 | 3/2016 |
| WO | 2015153411 | 10/2015 |

OTHER PUBLICATIONS

European Search Report for Application No. 17193897.0, dated Apr. 19, 2018.

* cited by examiner

*Primary Examiner* — Jacob M Amick
*Assistant Examiner* — Charles Brauch
(74) *Attorney, Agent, or Firm* — Norton Rose Fulbright Canada LLP (57) ABSTRACT

A compressor of a gas turbine engine is described which includes a rotor and a stator located immediately downstream of the rotor. The stator comprises a plurality of stator vanes each having an airfoil extending along a generally radial span between a root and a tip of the airfoil. The radially inner portion has aerodynamic forward sweep at the leading edge, the forward sweep having a maximum forward sweep that is more forward than a sweep at the leading edge in the intermediate portion.

18 Claims, 8 Drawing Sheets

COMPRESSOR STATOR VANE WITH LEADING EDGE FORWARD SWEEP

TECHNICAL FIELD

The application relates generally to compressors of gas turbine engines and, more particularly, to stator vanes for such compressors.

BACKGROUND

Non-uniform inlet pressure of incoming fluids and high flow turning in turbomachinery can lead to three-dimensional flow structures forming along stator vanes within a gas turbine engine. These flow structures are known as "secondary flow", and are transverse to the main flow which is responsible for torque generation. The secondary flow along the root of the stator vane typically dissipates before reaching a downstream component.

However, in some instances, secondary flow extends along a radial length of the stator vane and is not dissipated. For stators disposed in axially-spaced-apart rows, momentum deficits in the flow can build up between rows of stators and be passed down from upstream rows. The airfoils of stator vanes which experience these upstream momentum flow deficits can experience higher loss and higher trailing edge deviations, which can negatively affect the overall compressor performance or stall range.

SUMMARY

There is accordingly provided a compressor of a gas turbine engine, comprising: a rotor and a stator located immediately downstream of the rotor, the stator comprising a plurality of stator vanes each having an airfoil extending along a generally radial span between a root and a tip of the airfoil and having a chord with a chord length defined between a leading edge and a trailing edge of the airfoil, the airfoil having a radially inner portion defined by an inner approximately 40% of the span, a radially outer portion defined by an outer approximately 40% of the span, and an intermediate portion between the inner and outer portions, the radially inner portion having aerodynamic forward sweep at the leading edge, the forward sweep having a maximum forward sweep that is more forward than a sweep at the leading edge in the intermediate portion.

There is also provided a gas turbine engine, comprising: a compressor with a rotor and a stator located immediately downstream of the rotor, the stator comprising a plurality of stator vanes each having an airfoil extending along a generally radial span between a root and a tip of the airfoil and having a chord with a chord length defined between a leading edge and a trailing edge of the airfoil, the airfoil having a radially inner portion defined by an inner approximately 40% of the span, a radially outer portion defined by an outer approximately 40% of the span, and an intermediate portion between the inner and outer portions, the radially inner portion having aerodynamic forward sweep at the leading edge, the forward sweep having a maximum forward sweep that is more forward than a sweep at the leading edge in the intermediate portion.

There is further provided a method of forming a stator vane, comprising: providing an airfoil having a chord with a chord length and a generally radial span extending over a radially inner portion defined by an inner approximately 40% of the span, a radially outer portion defined by an outer approximately 40% of the span, and an intermediate portion between the inner and outer portions; and forming an aerodynamic forward sweep on at least a leading edge of the airfoil within the radially inner portion, the forward sweep having a maximum forward sweep that is more forward than a sweep at the leading edge in the intermediate portion.

BRIEF DESCRIPTION OF THE DRAWINGS

Reference is now made to the accompanying figures in which.

DETAILED DESCRIPTION

Figure 1:
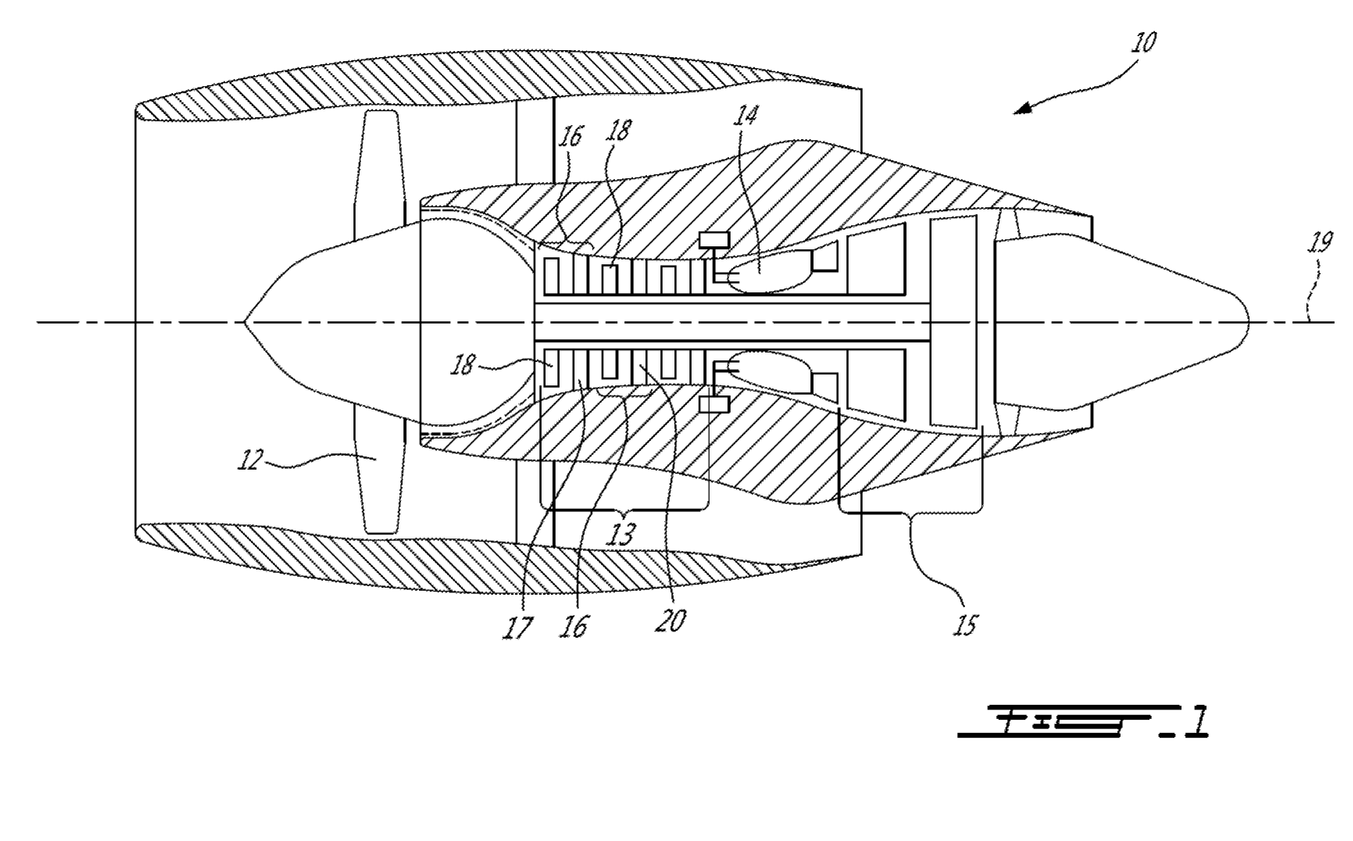
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor 13 for pressurizing the air, a combustor 14 in which the compressed air is mixed with fuel and ignited for generating an annular stream of hot combustion gases, and a turbine section 15 for extracting energy from the combustion gases.

The compressor 13 includes one or more axial compressor stages 16. Each compressor stage 16 includes one or more rows of compressor stators 17 located immediately downstream of a row of compressor rotors 18. Each compressor stator 17 is a non-rotating component that guides the flow of pressurized air towards and from the compressor rotors 18. The compressor rotors 18 rotate about a longitudinal center axis 19 of the gas turbine engine 10 to perform work on the air.

Each compressor stator 17 has a plurality of stator vanes 20. Each stator vane 20 is a stationary body that diffuses the airflow impinging thereon, thereby converting at least some of the kinetic energy of the incoming airflow into increased static pressure. Each stator vane 20 also redirects the airflow toward the next downstream compressor rotor 18.

Figure 2A:
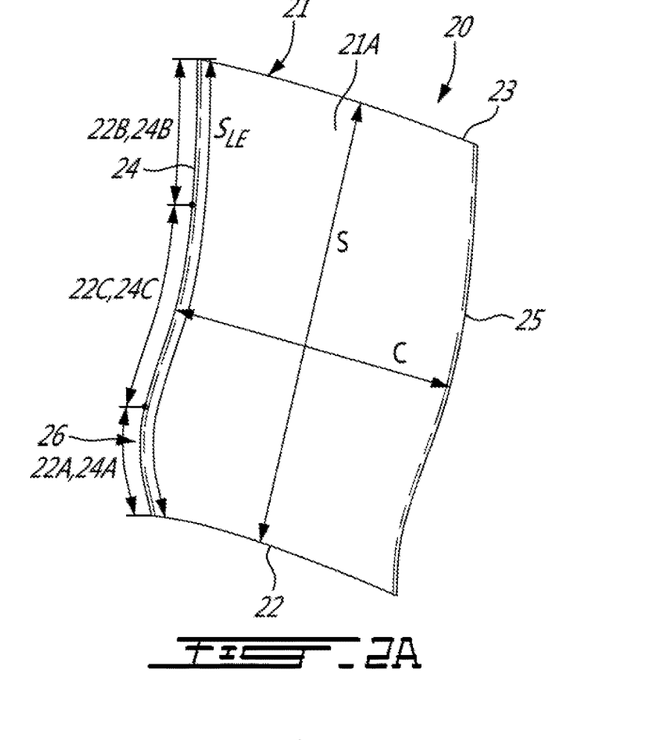
FIG. 2A is a side view of a stator vane of a compressor of the gas turbine engine of FIG. 1, the stator vane shown in an axial plane projection.
Figure 2B:
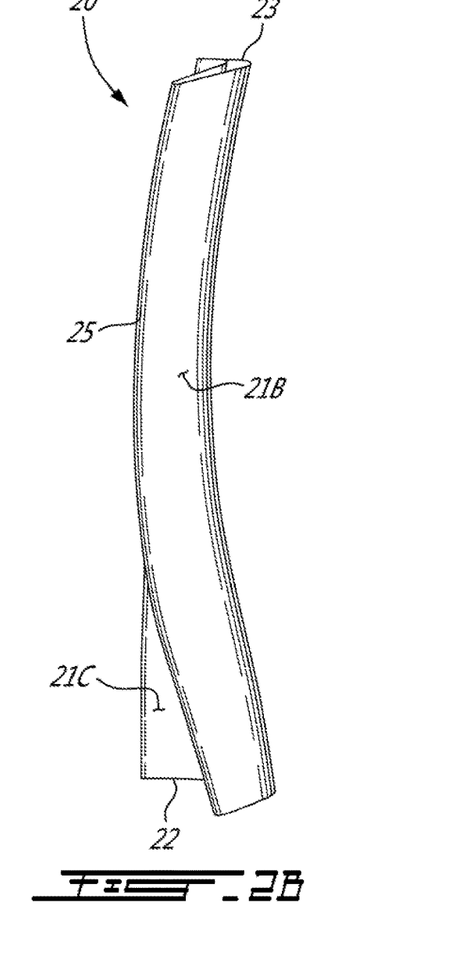
FIG. 2B is a rear view of the stator vane of FIG. 2A shown in a tangential plane projection.

Referring to FIGS. 2A and 2B, each stator vane 20 has an airfoil 21 shaped and sized to effect the above-describe functionality. More particularly, the airfoil 21 has a body 21A including outer opposed surfaces 21B, 21C. The airfoil 21 also includes a root 22 disposed adjacent to a radially inner hub or shroud of the compressor stator 17, and a distal tip 23 disposed adjacent to an outer shroud of the compressor stator 17. The chord length of the airfoil 21 is defined between a leading edge 24 of the airfoil 21, and a trailing edge 25 of the airfoil 21. A fillet between the root 22 of the airfoil 21 and a vane platform (not shown) may optionally be added for stress reduction or other purposes.

The airfoil 21 in the radial direction (i.e. in a direction that generally extends parallel to a radial line from the center axis 19 of the gas turbine engine 10) is defined between the root 22 and the tip 23, and is referred to herein as the radial span S. Similarly, the extent of the airfoil 21 along its chord is defined between the leading edge 24 and the trailing edge 25, and is referred to herein as the chord length C. In the depicted embodiment, the chord length C is the length of the chord line (the chord is depicted at the approximately mid-span location), which may be thought of as a straight line connecting the leading and trailing edges 24,25. The airfoil 21 is conceptually divided into stacked radial segments (not shown). The airfoil 21 can be defined as having a radially inner portion 22A adjacent to the root 22 of the airfoil 21 and extending generally radially outwardly therefrom, a radially outer portion 22B adjacent to the tip 23 of the airfoil 21 and extending generally radially inwardly therefrom, and an intermediate portion 22C extending between the inner and outer portions 22A,22B Due to the exit condition of airflow from upstream rows of compressor rotors and stators, airflow into the leading edge of the airfoil of the stator vane may have low momentum. This low inlet momentum airflow at the leading edge, when combined with the airfoil's own secondary flow, can cause increased flow shedding and flow deviation to occur at the trailing edge of the airfoil. These adverse effects can influence the performance of downstream rows of the compressor stages, and therefore become compounded throughout the rows of the compressor stages. This can affect the overall performance of the compressor section and its range.

Still referring to FIGS. 2A and 2B, and as explained in greater detail below, at least the leading edge 24 of the airfoil 21 disclosed herein protrudes outwardly in the direction of the airflow at areas of the airfoil 21 where there is expected to be low momentum in the airflow. This localised forward extension of the leading edge 24 where the low momentum airflow is present can help to reduce shedding at the trailing edge 25, and can help to reduce flow deviation at the trailing edge 25. These effects, when combined with similar effects from downstream compressor stators 17, may improve the overall performance of the compressor 13 and its range.

The shape of at least the leading edge 24 is thus modified to redistribute high energy flow to where it is most useful. Similarly to the airfoil 21, the leading edge 24 is conceptually divided into radial segments or portions. The leading edge 24 can be defined as having a radially inner portion 24A adjacent to the root 22 of the airfoil 21 and extending generally radially outwardly therefrom, a radially outer portion 24B adjacent to the tip 23 of the airfoil 21 and extending generally radially inwardly therefrom, and an intermediate portion 24C extending between the inner and outer portions 24A,24B. The leading edge 24 has a region of forward aerodynamic sweep along a portion of the span of the leading edge 24, as shown at least in FIG. 2A. The sweep distribution along the leading edge 24 in the region of forward sweep is arranged so that a leading edge extension, "bump", or "belly region" 26 is defined that extends forward (i.e. upstream) into the airflow relative to the remainder of the leading edge 24 profile, as described in greater detail below.

The term "sweep" as used herein is understood to refer to the aerodynamic sweep of the airfoil. The term "aerodynamic" refers to the sweep being determined as a function of the aerodynamic properties (e.g. velocity) at a point on the leading edge 24. The value of the aerodynamic sweep at any point on the leading edge 24 is therefore largely dependent on the local airflow conditions at that particular point. It will therefore be appreciated that the aerodynamic sweep at a particular location on the leading edge 24 may not be representative of the geometric sweep at the same location on the leading edge. The determination and definition of aerodynamic sweep, as well as the formula used to determine the aerodynamic sweep angle at any point on the airfoil 21, is described in U.S. Pat. No. 8,147,207 B2, the entirety of which is hereby incorporated by reference. The calculation of the aerodynamic sweep angle S and the aerodynamic dihedral angle D of the airfoil is also described hereinbelow, with reference to FIG. 6.

In accordance with at least one embodiment of the present disclosure, the leading edge 24 of the stator vane 20 is more forwardly swept in the inner portion 24A than in the intermediate portion 24C of the leading edge 24. More particularly, the radially inner portion 24A has an extent of aerodynamic forward sweep. The forward sweep has a maximum forward sweep that is more forward than the sweep at the leading edge 24 in the intermediate portion 24C. The sweep at the leading edge 24 in the intermediate portion 24C can be forward or aft. The leading edge 24 is therefore shaped to redistribute high energy flow from near the root 22 of the airfoil 21 to where it is most useful. In the embodiment of FIG. 2A, the belly region 26 represents an extent of the inner portion 24A that has a maximum forward sweep. As can be seen, the maximum forward sweep of the inner portion 24A is more forward than the sweep of the leading edge 24 along the intermediate portion 24C. The expression "more forward" refers to a comparison between the aerodynamic sweep angles along the inner portion 24A, and the sweep angles along the intermediate portion 24C.

In an alternate embodiment, the belly region 26 extends across part of both the inner and intermediate portions 24A,24C of the leading edge 24, such that at least part of both the inner and intermediate portions 24A,24C is forwardly swept. In such an embodiment, the leading edge 24 is still more forwardly swept in the part of the inner portion 24A than in the part of the intermediate portion 24C.

Figure 2C:
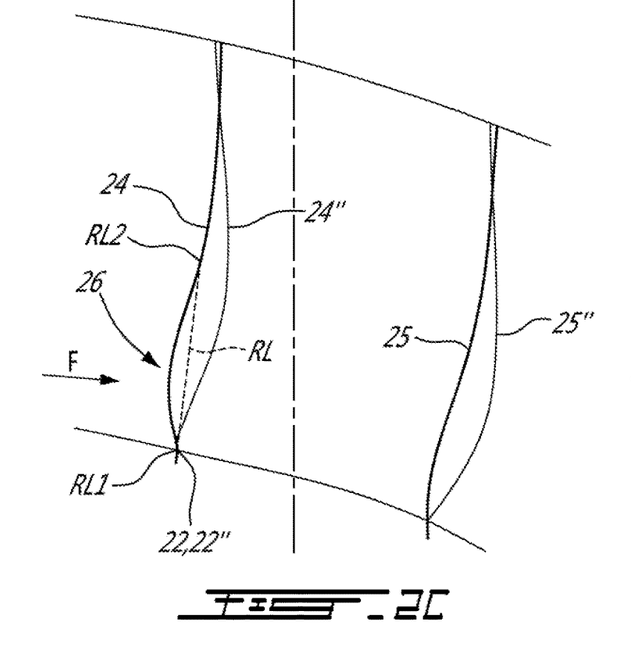
FIG. 2C is a schematic view of an axial projection of the profile of the leading edge and trailing edge of the stator vane of FIGS. 2A and 2B, and conventional leading and trailing edge profiles shown for comparison purposes.

The contrast between the profile of the leading edge 24 and its belly region 26 versus that of a conventional airfoil 21" is better appreciated in FIG. 2C. As can be seen, the area of the leading edge 24 adjacent to the root 22 of the airfoil 21 protrudes outwardly or upstream into the airflow F. In contrast, the same area of the leading edge 24" adjacent to the root 22" of the conventional airfoil 21" is recessed inwardly from the airflow F. Similarly, the area of the trailing edge 25" adjacent to the root 22" of the conventional airfoil 21" is recessed inwardly from the airflow F, in contrast to the same area of the trailing edge 25 which protrudes outwardly or upstream into the airflow F.

Figure 3A:
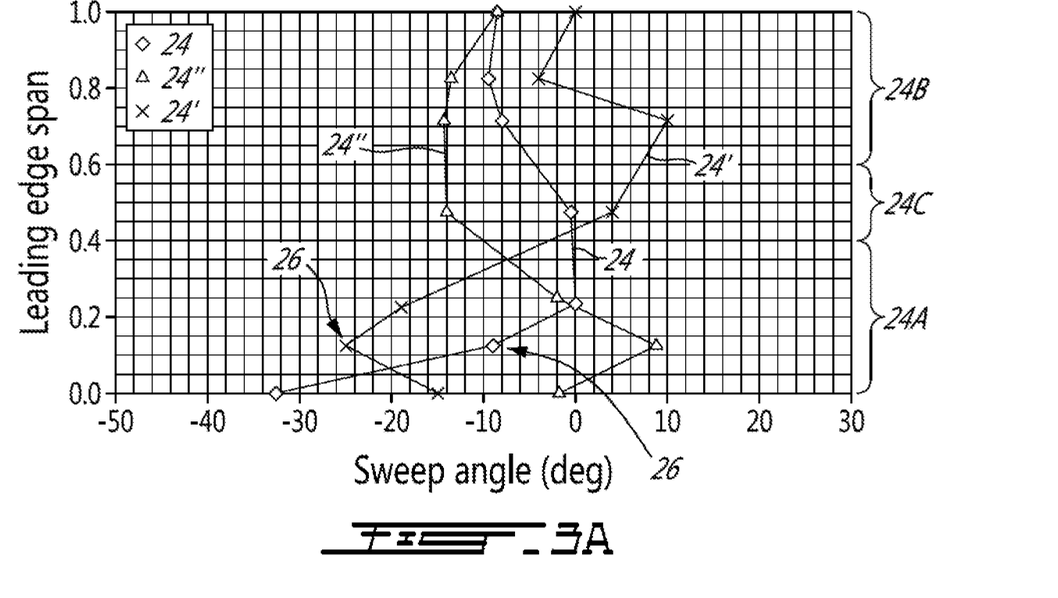
FIG. 3A is a graph showing a sweep angle of a leading edge of a stator vane along the span of the leading edge.

Referring to FIG. 3A, the aerodynamic sweep angle of the leading edges 24,24' is shown versus the radial span of the leading edges 24,24' and compared to the aerodynamic sweep angle of a notional leading edge profile 24" of a conventional radial stator airfoil 21". It should be understood that the values for angles along the horizontal axis of FIG. 3A depict aft sweep angles as positive (+) angles and forward sweep angles as negative (−) angles. However, in the description of the sweep angles provided herein, the direction of the sweep angle is sometimes identified by the terminology "aft sweep" and "forward sweep," using only the magnitude of the angle without reference to the positive or negative sign convention found in FIG. 3A.

In the embodiment of FIG. 3A, the inner portion 24A of the leading edge 24 extends between the 0% and the 40% span positions, and the intermediate portion 24C extends between the 40% and the 60% span positions. The outer portion 24B therefore extends between the 60% and the 100% span positions. In the embodiment of FIG. 3A, the leading edge 24 sweeps forward along the entire span of the leading edge 24. The maximum forward sweep of the leading edge 24 is along the inner portion 24A at the 0% span position, indicating that the leading edge is most swept forward near the root of the airfoil. The aerodynamic sweep angle of the maximum forward sweep in the inner portion 24A is about −32°, whereas the aerodynamic sweep angle of the maximum forward sweep in the intermediate portion 24C is −5°. Since negative sweep angles are indicative of forward sweep, it follows that the maximum forward sweep in the inner portion 24A is more forward than the sweep in the intermediate portion 24C. The forward sweep angle is nearly zero between the 22% and 50% span positions, indicating that there is almost no aerodynamic forward sweep of the leading edge 24 along this span. The leading edge 24 is therefore more forwardly swept in the inner portion 24A than in the intermediate portion 24C of the leading edge 24.

Still referring to FIG. 3A, the leading edge 24' sweeps forward along the inner portion 24A and part of the outer portion 24B of the leading edge 24. The aerodynamic sweep angle of the maximum forward sweep of the leading edge 24' is at the 13% span position and has a sweep angle value of −25°, indicating that the leading edge is most swept forward near the root of the airfoil. The maximum forward sweep is therefore disposed between 5% and 30% of the span. The aerodynamic sweep angle of the maximum forward sweep in the intermediate portion 24C is −3°. Since negative sweep angles are indicative of forward sweep, it follows that the maximum forward sweep in the inner portion 24A of the leading edge 24' is more forward than the sweep in the intermediate portion 24C. The sweep angle decreases outboard from the 75% span position to the tip indicating that the leading edge 24' sweeps slightly forward from this position to the tip of the airfoil. The leading edge 24' is therefore more forwardly swept in the inner portion 24A than in the intermediate portion 24C of the leading edge 24'.

Still referring to FIG. 3A, the sweep angle curve of the conventional leading edge 24" differs from that of the leading edges 24,24'. In the inner portion 24A of the leading edge 24", the leading edge 24" is swept aft outward from the root at the 0% span position until about the 23% span position. The leading edge 24" therefore has an aft sweep adjacent to the root. It is understood that secondary flow in combination with upstream flow deficit is strongest between 10-20%. The conventional leading edge 24" is therefore swept aft or "inwardly" in this flow deficit region, in contrast to the leading edges 24,24'. It follows that the maximum forward sweep in the inner portion 24A of the leading edge 24" is less forward than the sweep in the intermediate portion 24C. The leading edge 24" is less forwardly swept in the inner portion 24A than in the intermediate portion 24C of the leading edge 24".

Figure 3B:
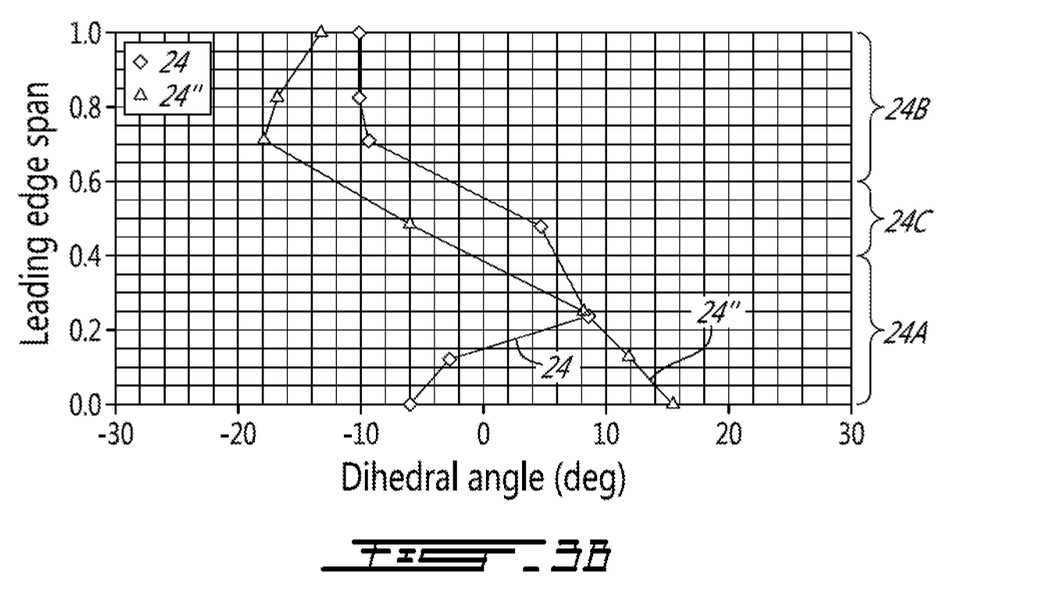
FIG. 3B is a graph showing a dihedral angle of a leading edge of a stator vane along the span of the leading edge.

FIG. 3B shows an embodiment of leading edge dihedral distribution along the span of the leading edge 24 compared to the aerodynamic dihedral angle of a notional leading edge profile 24" of a conventional radial stator airfoil 21". The determination and definition of aerodynamic dihedral, as well as the formula used to determine the aerodynamic dihedral angle at any point on the airfoil 21, is described in U.S. Pat. No. 8,147,207 B2, the entirety of which was previously incorporated by reference. It should be understood that the values for angles along the horizontal axis of FIG. 3B depict aft dihedral angles as negative (−) angles and forward dihedral angles as positive (+) angles. However, in the description of the dihedral angles provided herein, the direction of the dihedral angle is sometimes identified by the terminology "aft dihedral" and "forward dihedral," using only the magnitude of the angle without reference to the positive or negative sign convention found in FIG. 3B.

As can be seen, the radially inner portion 24A has aerodynamic dihedral at the leading edge 23. From the 0% span position at the root of the airfoil to about the 13% span position, the leading edge 24 has a negative dihedral angle, and thus a decreasing aft dihedral. The leading edge dihedral is therefore aft at the root of the airfoil. More particularly, the leading edge dihedral has a maximum aft dihedral at the root that is more aft than the dihedral in a remainder of the inner portion 24A. Outboard from the 13% span position, the dihedral angle increases and becomes positive, indicating that the leading edge 24 has a forward dihedral. Outboard from about the 55% span position, the dihedral angle decreases and becomes negative, indicating that the radially outer portion 24B of the leading edge 24 has a negative dihedral inboard of the tip. In contrast, the conventional leading edge profile 24" has positive dihedral angle outboard from the root to about the 40% span position.

The shape and size of the belly region 126 can vary. Referring to the schematic illustrations of FIGS. 4A and 4B, the stator vane 120 is shown in axial projection, sometimes referred to as a side view. The axial projection is a projection of the stator vane 120 in an axial plane, where the axial plane is defined by the longitudinal center axis 19 which lies in the axial plane. In the axial projection, the belly region 126 has a radial height or extent R. The radial extent R represents the distance occupied by the belly region 126 on the leading edge 124. The radial extent R is expressed herein in normalised terms as a percentage of the radial length or span $S_{LE}$ of the leading edge 124. The span $S_{LE}$ is the total radial length of the leading edge 124, and is sometimes expressed herein in normalised terms as well. In the depicted embodiment, the span $S_{LE}$ of the leading edge 124 is the same length as the radial span S of the airfoil 121. In alternate embodiments, the span $S_{LE}$ of the leading edge 124 has a different length than that of the radial span S of the airfoil 121. A position referred to herein as a 0% position on the span $S_{LE}$ corresponds to a position on the leading edge 124 at the junction of the leading edge 124 and the root 122 of the airfoil 121. Similarly, a position referred to herein as a 100% position on the span $S_{LE}$ corresponds to a position on the leading edge 124 at the junction of the leading edge 124 and the tip 123 of the airfoil 21. It can thus be appreciated that a position referred to herein as being between a 0% and a 100% position on the span $S_{LE}$ corresponds to a position on the leading edge 124 between the root 122 and the tip 123 of the airfoil 121.

Figure 4A:
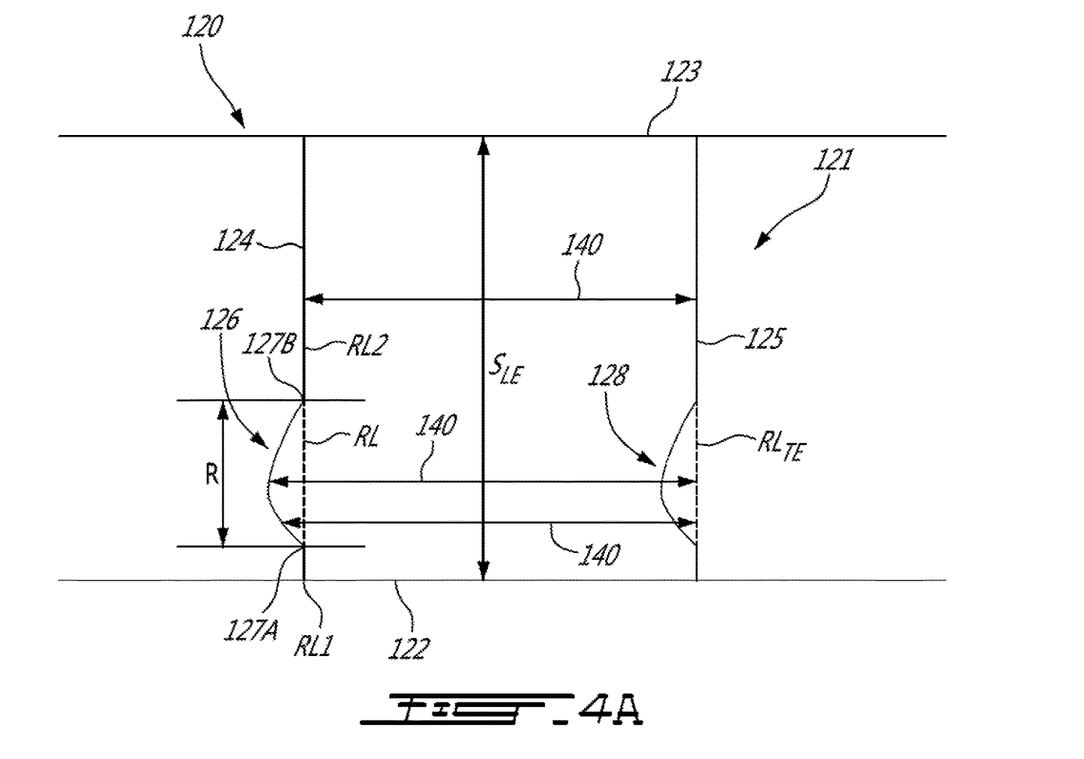
FIG. 4A is a schematic axial projection or side view of a stator vane described herein.
Figure 4B:
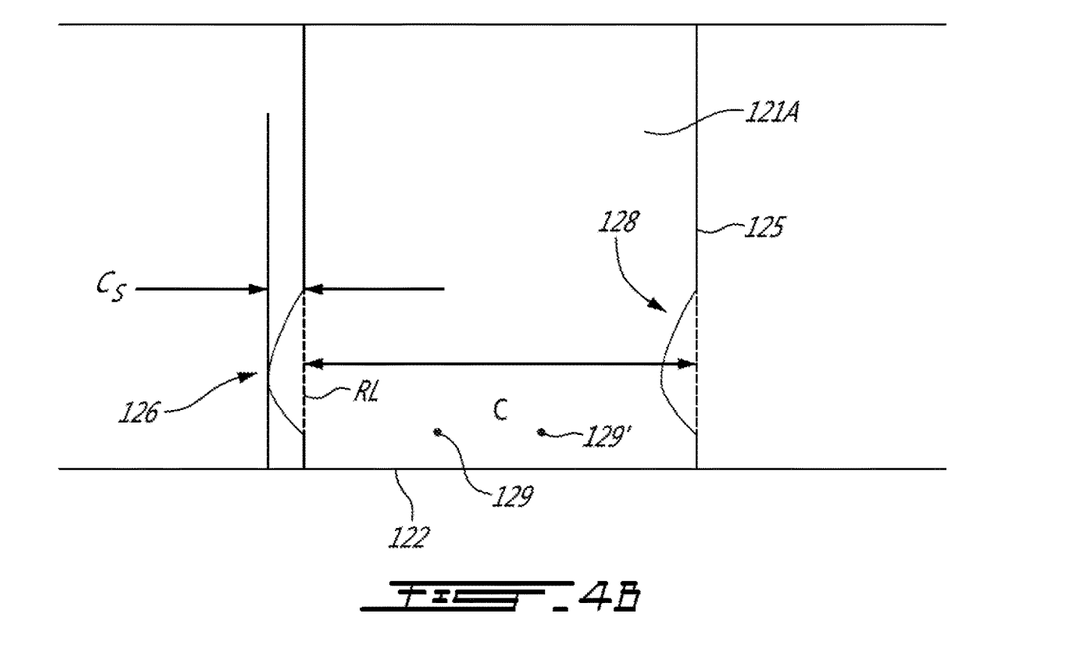
FIG. 4B is a schematic axial projection or side view of a the stator vane of FIG. 4A.

The belly region 126 extends forwardly of a reference line RL in the axial projection. The reference line RL extends between a first point RL1 defined at an intersection of the leading edge 124 and the root 122, and a second point RL2 on the leading edge 124 at 50% of the span. The belly region 126 therefore extends forward relative to a mid-span portion of the leading edge 124.

In the depicted embodiment, the radial extent R of the belly region 126 is between about 5% and about 30% of the span $S_{LE}$. Stated differently, the belly region 126 has a radial length corresponding to between about 5% and about 30% of the total radial length of the leading edge 124. The belly region 126 also has a chord length. The belly region 126 protrudes from the reference line RL in the upstream direction a maximum chord extent $C_S$ being between 5% and 30% of the chord length C of the airfoil 121. The chord extent $C_S$ being is measured in the depicted embodiment to the most upstream point of the belly portion 126. Stated differently, the belly region 126 has a chord length corresponding to between about 5% and about 30% of the total chord length of the airfoil 121. The belly region 126 thus protrudes forwardly into the flow stream over a defined extent of the leading edge 124. This localised extension, or "speed bump", on at least the leading edge 124 helps to redistribute high energy flow toward areas of the airfoil 121 which experience low momentum flow, and thus helps to reduce the effect of a relatively weak upstream flow profile. A chord extent $C_S$ exceeding 30% of the chord length C may affect the airflow at adjacent stator vanes 120, and may affect the structural integrity of the stator vane 120, as well as the gap with upstream airfoils.

Similarly to the radial and chord length of the belly region 126, the location of the belly region 126 on the leading edge 124 can vary. In the depicted embodiment, the radial extent R of the belly region 126 is defined between spaced apart first and second radial positions 127A,127B on the leading edge 124. The first radial position 127A is shown as being located closer to the root 122 of the airfoil 121 than the second radial position 127B. The second radial position 127B is located on the leading edge 24 at a position being between the 0% and 40% position on the span $S_{LE}$. In the embodiment of FIG. 4A, the belly region 126 is therefore located along the leading edge 124 between the root 122 of the airfoil 121 to some point along the leading edge 124 in proximity to the root 122.

Still referring to FIG. 4A, the belly region 126 is on a portion of the leading edge 124 located between the 10% and 20% position on the span $S_{LE}$ of the leading edge 124. It has been observed that adverse secondary flow in stator vanes rises up from near the hub of the compressor stator along the suction side of the airfoil and sheds at between about 10% and about 20% of span of the leading edge. It has also been observed from conventional stator vanes that the momentum deficit at the leading edge caused by the low momentum airflow is present at a location on the leading edge at about 15% of the span of the leading edge. By positioning the belly region 126 within these regions of the leading edge 124, the belly region 126 contributes to reducing the effects of this secondary flow and helps to rebalance the flow, thereby helping to provide an aerodynamic benefit. The belly region 126 in this location of the leading edge 124 may allow flow to be intercepted earlier, so that more flow can be pulled toward the momentum deficit region located at about 15% of the span of the leading edge.

The location of the belly region 126 on the leading edge 124 is not limited to regions of the leading edge 124 adjacent to the root 122. In an alternate embodiment, the first radial position 127A is disposed on the leading edge 124 at a position corresponding to the 100% position on the span $S_{LE}$ of the leading edge 124. Stated differently, the first radial position 127A in this embodiment is located on the leading edge 124 where it intersects the tip 123, such that the belly region 126 extends radially inward along the leading edge 124 from the tip 123 of the airfoil 121. In this embodiment, the belly region 126 is located closer to the outer hub or shroud of the compressor stator 17.

In a particular embodiment, and as shown in FIGS. 4A and 4B, the trailing edge 125 of the airfoil 121 has a trailing edge belly region 128 or bow. The trailing edge belly region 128 (sometimes referred to herein as "TE belly region 128") extends into the body of the airfoil 121 from the trailing edge 125 in a general upstream direction. More particularly, the trailing edge 125 in the axial projection has a trailing edge reference line $RL_{TE}$ extending between an intersection of the trailing edge 125 and the root 122, and a second point on the trailing edge 125 at 50% of the span of the trailing edge. As can be seen, both the leading edge belly region 126 and the TE belly region 128 are disposed adjacent to, and in close proximity with, the root 122 of the airfoil 121. Both the LE and TE belly regions 126,128 have the same radial extent R, where the extent R is between about 5% and about 30% of the span $S_{LE}$. Stated differently, the LE and TE belly regions 126,128 have a radial length corresponding to between about 5% and about 30% of the total radial length of the leading edge 124. Both the LE and TE belly regions 126,128 also have the same chord length. The TE belly region 128 protrudes into the body 121A of the airfoil 121 from the TE reference line $RL_{TE}$ in the upstream direction a chord extent $C_S$ being between 5% and 30% of the chord length C. Stated differently, both the LE and TE sweeps 126,128 have a chord length corresponding to between about 5% and about 30% of the total chord length of the airfoil 121.

In the depicted embodiment, the first and second radial positions 127A,127B defining the radial extent of the LE belly region 126 are disposed at locations on the leading edge 124 between the 0% and 100% positions on the span $S_{LE}$ of the leading edge 124. Stated differently, the LE belly region 126 is located between, and separate from, the root 122 and the tip 123. More particularly, the first and second radial positions 127A,127B are disposed at locations on the leading edge 124 between the 0% position and the 40% position on the radial span $S_{LE}$ of the leading edge 124.

The LE and TE belly regions 126,128 are also aligned along the chord. More particularly, both the LE and TE belly regions 126,128 are disposed along a portion of the leading and trailing edges 124,125, respectively, located between the 10% and 40% positions on the span of the leading and trailing edges 124,125. Therefore, in the depicted embodiment, at least the LE belly region 126 does not extend from the root 122 of the airfoil 121. Stated differently, the leading edge 124 has its regular or normal profile between the 0% position and the 10% position. The absence of a bump or protrusion of the LE belly region 126 in this portion of the airfoil 121 close to the root 122 allows the LE belly region 126 to be positioned only where it may have the greatest effect on low momentum flow. It has been observed from conventional stator vanes that the momentum deficit at the leading edge caused by the low momentum airflow is present at a location on the leading edge at about 15% of the span of the leading edge. In some embodiments, and as shown in FIGS. 4A and 4B, the TE belly region 128 can be similarly located along the trailing edge 125, such that the TE belly region 128 does not extend from the root 122 of the airfoil 121.

Still referring to FIGS. 4A and 4B, the airfoil 121 has a center of gravity 129. The center of gravity 129 of the airfoil 121 is forward or upstream of a center of gravity 129' of a conventional airfoil 121' without the LE belly region 126. It can thus be appreciated that the addition of the bump or protrusion of the LE forward sweep shifts the center of gravity 129 of the body 121A of the airfoil 121 forward of a similar un-swept stator vane having a correspondingly shaped and sized airfoil.

The airfoil 121 of FIGS. 4A and 4B has chord lines defined in sectional planes of the airfoil 121 that are transverse to its radial span. These section chord lines 140 each extend between the leading and trailing edges 124,125. In the embodiment where the airfoil has a leading edge belly region 126 and no corresponding TE belly region, the section chords 140 of the LE belly region 126 have lengths greater than the length of the remaining section chords 140.

In light of the preceding, it can be appreciated that the belly region 26,126 in the axial projection is a local increase or extension of the leading edge 24. In contrast to some conventional leading edge protrusions, the belly region 26,126, in at least some embodiments, is a sharp departure from the normal profile of the leading edge 24, and is not intended to be a smooth or gradual leading-edge shape, but rather a relatively discreet and abrupt change in the profile of the leading edge 24 at a specific radial location. The LE belly region 26,126 disclosed herein can be used on other types of stator vanes 20 as well, such as cantilevered stator vanes or cantilevered variable guide vanes.

It can thus be appreciated that the belly region 26,126 of the stator vanes 20 disclosed herein can, in at least some embodiments, improve the overall performance and stall range of the compressor 13 without incurring a penalty in increased weight, or increased number of parts. A conventional technique of improving flow range is to increase vane count. However, this would lead to increase performance loss, plus weight and cost increases. Other techniques involve adding chord length, but again the disadvantage would still be increases in engine length, cost, weight, etc. The belly region 26,126 would retain the same airfoil count and chord length, but with the additional aerodynamic benefits mentioned above.

Figure 5A:
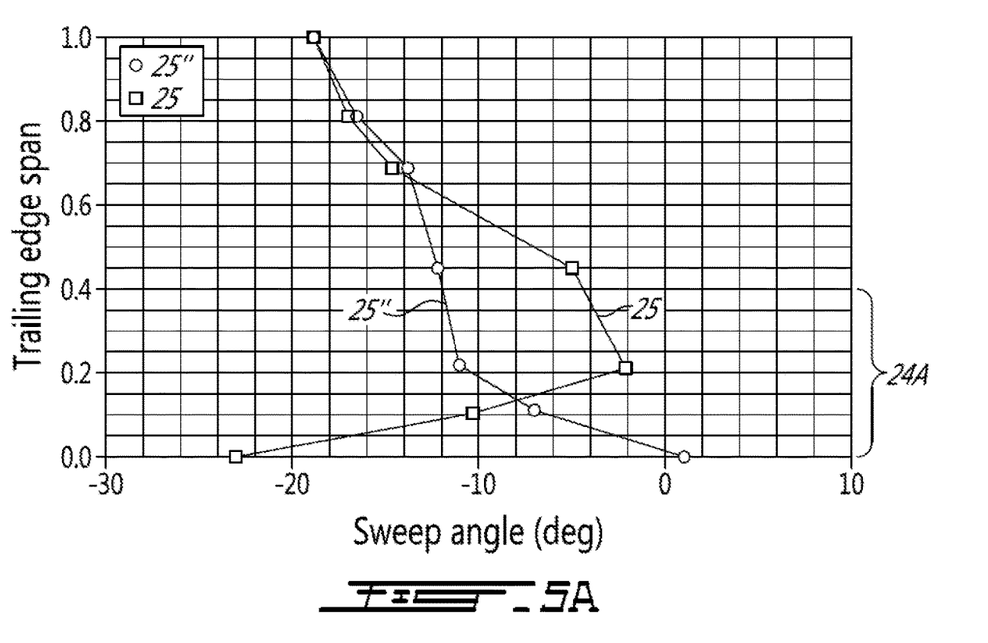
FIG. 5A is a graph showing a sweep angle of a trailing edge of a stator vane along the span of the trailing edge.

FIG. 5A shows the aerodynamic sweep angle of the trailing edge 25 versus the radial span of the trailing edge 25 and compared to the aerodynamic sweep angle of a notional trailing edge profile 25" of a conventional radial stator airfoil. It should be understood that the values for angles along the horizontal axis of FIG. 5A depict aft sweep angles as positive (+) angles and forward sweep angles as negative (−) angles. In the embodiment of FIG. 5A, the trailing edge 25 sweeps forward in proximity to the root. The maximum forward sweep of the trailing edge 25 is along the inner portion 22A of the airfoil at the 0% span position, indicating that the trailing edge 25 is most swept forward near the root of the airfoil. The aerodynamic sweep angle of the notional trailing edge 25" is positive at the root of the airfoil, and is thus swept aft.

Figure 5B:
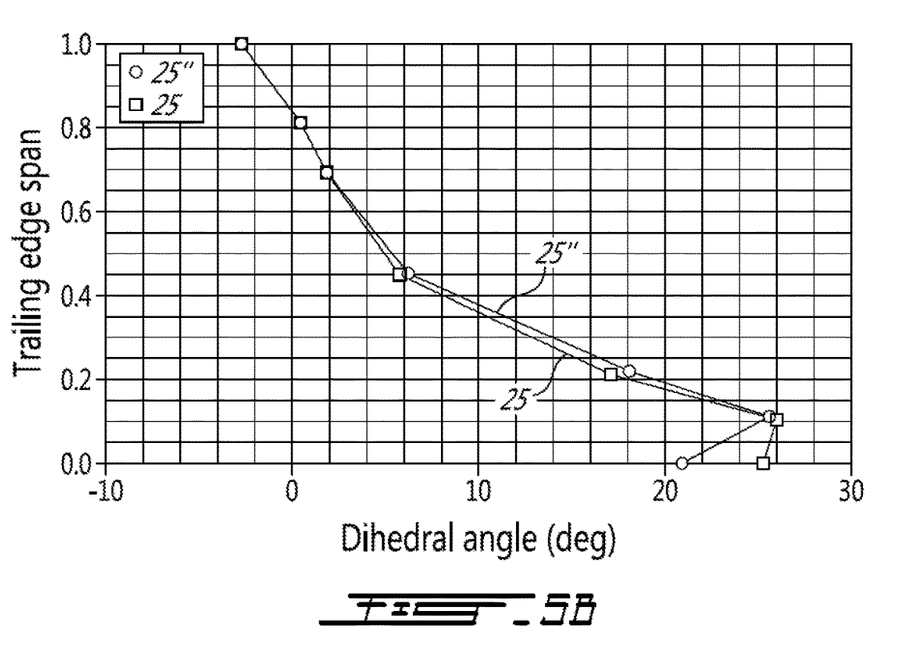
FIG. 5B is a graph showing a dihedral angle of a trailing edge of a stator vane along the span of the trailing edge.

FIG. 5B shows an embodiment of trailing edge dihedral distribution along the span of the trailing edge 25 compared to the aerodynamic dihedral angle of a notional trailing edge profile 25" of a conventional radial stator airfoil 21". It should be understood that the values for angles along the horizontal axis of FIG. 5B depict aft dihedral angles as negative (−) angles and forward dihedral angles as positive (+) angles. The dihedral angle is positive for most of the span of the trailing edge, indicating that the trailing edge 25 has forward dihedral over this span.

Figure 6A:
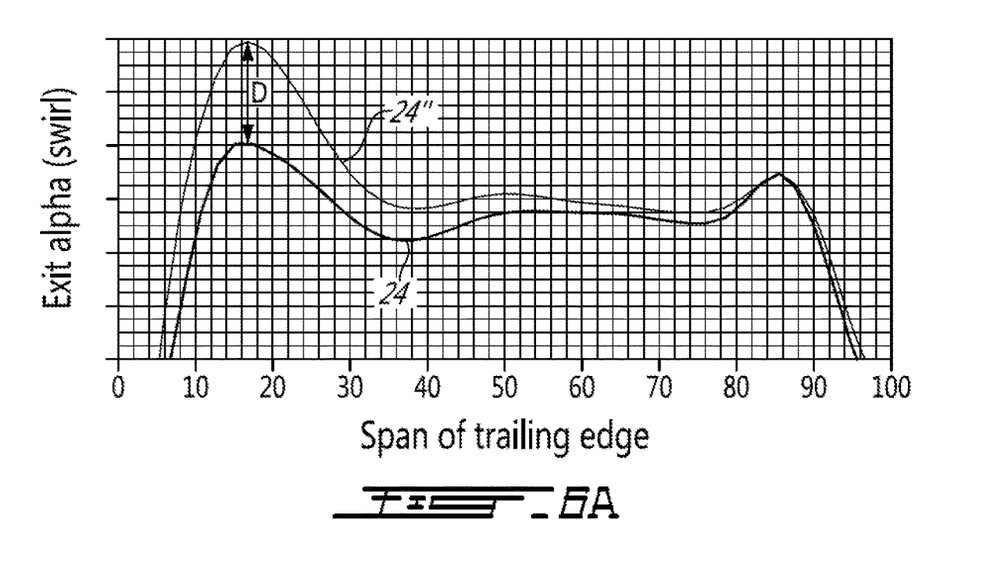
FIG. 6A is a graph showing flow turning at a trailing edge of a stator vane.
Figure 6B:
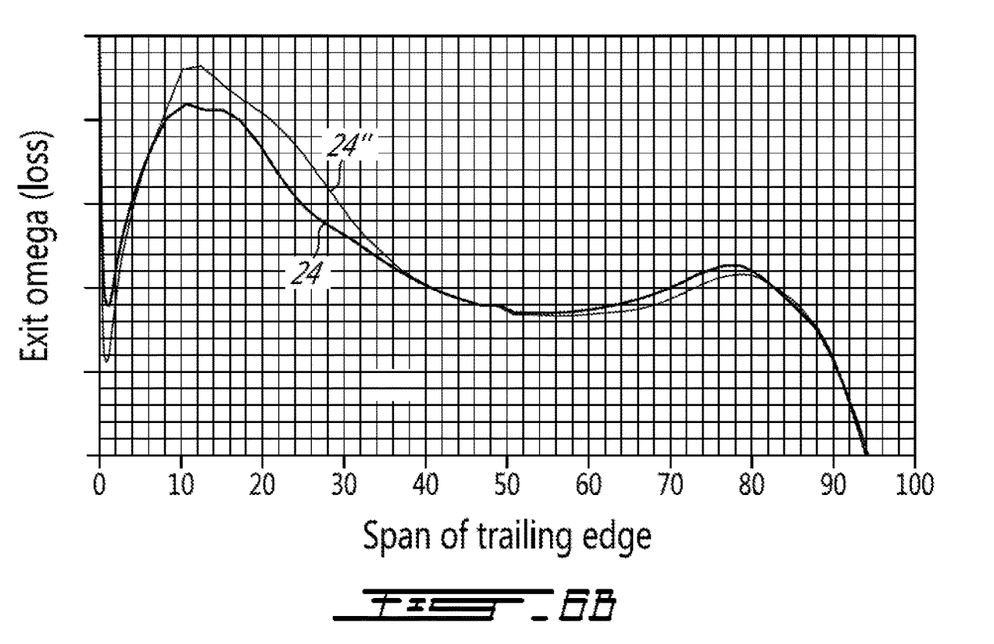
FIG. 6B is a graph showing airfoil loss at a trailing edge of a stator vane.

FIGS. 6A and 6B show improvements in some aerodynamic parameters compared to stator vanes without the disclosed belly region 26. The X-axis plots the radial span of the trailing edge, and the Y-axis plots the aerodynamic parameter. FIG. 6A is a comparison of flow turning (i.e. exit alpha) along the trailing edge of the airfoil. FIG. 6A shows that there is an improvement in vane turning (i.e. swirl) for the leading edge 24 disclosed herein versus a conventional leading edge 24" without the belly region 26, over the entire span of the trailing edge from hub to shroud, with the maximum difference D in peaks at around 17% span being about 4°. FIG. 6B compares airfoil loss (exit omega) at the trailing edge for the leading edge 24 disclosed herein versus a conventional leading edge 24" without the belly region 26. Exit omega (i.e. loss) is reduced by 5.4%. FIGS. 6A and 6B suggest that the added stall range and improvement in exit profiles toward downstream components can be achieved.

Referring to FIGS. 2A and 2B, there is also disclosed a method of forming the stator vane 20. The method includes providing the airfoil 21 having a radial span S and a chord length C. The method also includes forming the belly region 26 on the leading edge 24. The leading edge 24 is more forwardly swept in the inner portion 24A than in the intermediate portion 24C.

Figure 7:
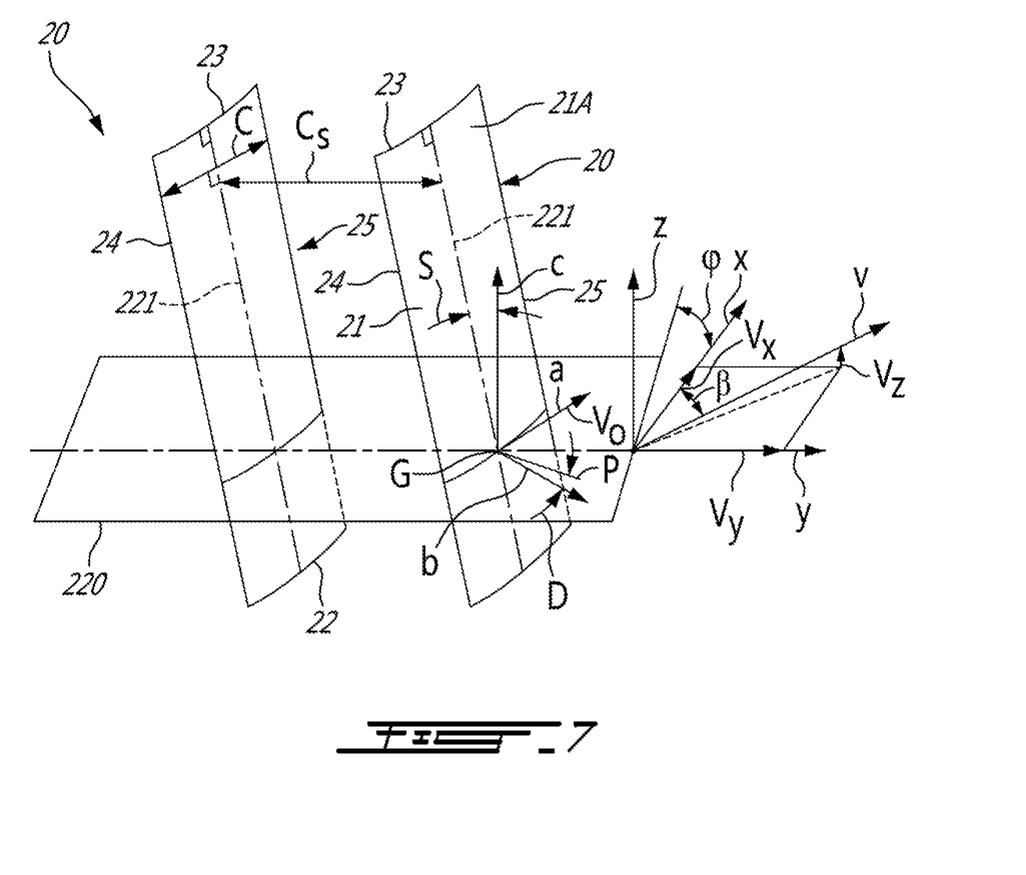
FIG. 7 is a schematic representation of compressor vanes with an exemplary stream surface flowing thereover, and including exemplary coordinate systems and parameters for defining aerodynamic sweep and aerodynamic dihedral.

For the purposes of defining the terms "sweep" and "dihedral" herein, FIG. 7 schematically depicts two vanes 20, having forward sweep, with a representative axisymmetric stream surface 220 passing through one of the radial sections of the airfoil 21. It is understood that conventional 2-D streamlines are projections of the 3-D stream surfaces 220 over the vane 20. Each of the airfoils 21 includes a chord C extending from the leading edge 24 to the trailing edge 25 at each radial section, and the length of the chord C may vary along the span of the airfoil 21. The vanes 20 are also conventionally circumferentially spaced from each other along the y-axis at a distance $C_s$. The relative velocity vector V lying in the axisymmetric stream surface 220 may be represented by its respective velocity vector components relative to the x-y-z coordinate system $V_x$, $V_y$, and $V_x$ as shown. The relative velocity vector V is represented at a location adjacent to the airfoil 21 by the velocity vector $V_0$, where velocity vector $V_0$ is aligned with the relative velocity vector V.

A sweep angle S and dihedral angle D may be defined for any location on the airfoil 21. For the present example, the sweep angle S and dihedral angle D are described with reference to a location corresponding to the airfoil axis 221, and with reference to a point G where the stream surface 220 intersects the airfoil axis 221. It will be appreciated that the sweep angle S and dihedral angle D can also be described with reference to a location corresponding to the intersection of the leading edge 24 and the stream surface 220. A Cartesian coordinate system a-b-c is defined with an origin at point G, with the a-axis coinciding with the velocity vector $V_0$, the b-axis extending normal to the airfoil surface, and the c-axis tangential to the airfoil surface. The sweep angle, S, is defined as the angle between the c-axis and the airfoil axis 221. The dihedral angle, D, is defined as the angle between the b-axis and the projection of the b-axis onto the stream surface 220, as denoted by line P.

The aerodynamic sweep angle S and the aerodynamic dihedral angle D may be represented as follows:

$$\operatorname{Sin} S = \frac{\tan\varphi + \tan\mu + \tan\eta\tan\beta}{\sqrt{(1+\tan^2\eta+\tan^2\mu)(1+\tan^2\beta+\tan^2\varphi)}}$$

-continued $$\sin D = \frac{\sec\varphi\tan\eta - \tan\beta(\sin\varphi + \cos\varphi\tan\mu)}{\sqrt{(1 - \tan\varphi\tan\mu)^2 + (\tan\beta - \tan\varphi\tan\eta)^2 + (\tan\eta - \tan\beta\tan\mu)^2}}$$

Wherein, $\varphi$=meridional angle, $\arctan(V_z/V_x)$, and $V_z$ is the component of the streamline velocity V along the radial z-axis, and $V_x$ is the component of the streamline velocity V along the axial x-axis;

$\beta$=cylindrical air angle, $\arctan(V_y/V_x)$, and $V_y$ is the component of the streamline velocity V along the circumferential y-axis;

$\mu$=the local axial tilt angle, or angle of inclination, of a longitudinally extending portion of the airfoil axis 221 of the airfoil 21 in the x-z plane relative to the radial z-axis against which the air flows; and $\eta$=the local tangential lean angle, or angle of inclination, of the longitudinally extending portion of the airfoil axis 221 of the airfoil 21 in the y-z plane relative to the z-axis against which the air flows.

Figure 8:
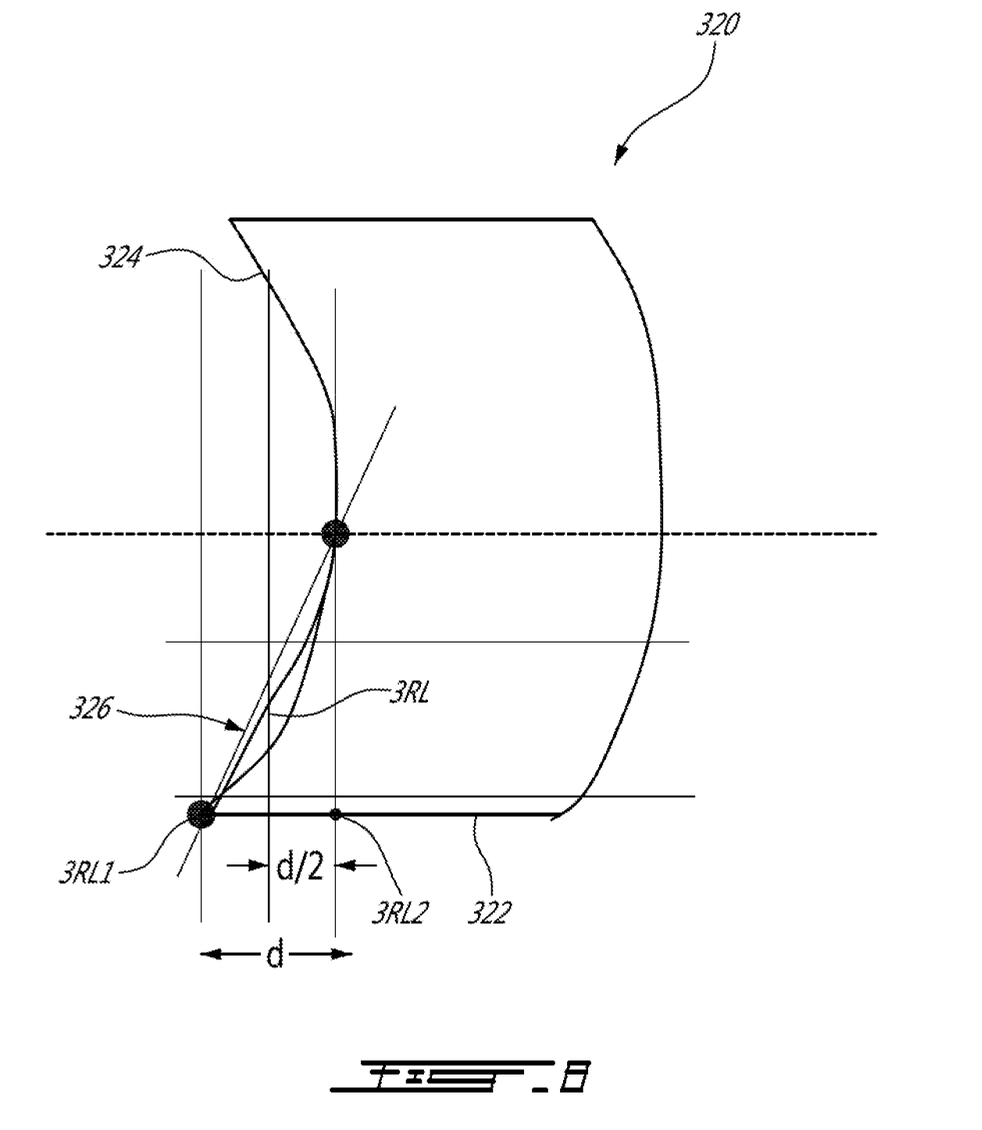
FIG. 8 is a schematic axial projection or side view of a stator vane described herein.

FIG. 8 is a schematic illustration of the stator vane 320 is shown in axial projection. The stator vane 320 has leading edge 324 that is rearwardly swept along a portion of the leading edge span. The leading edge 324 also has a forwardly swept belly region 326 along the inner portion of the leading edge 324. In the depicted embodiment, an axial distance d is defined from a first point 3RL1 defined at an intersection of the leading edge 324 and the root 322 to a second point 3RL2 on the root 322 that is radially aligned with a point on the leading edge 324 at 50% of the span. In the depicted embodiment, the extent of the belly region 326 along the leading edge 324 is between about 5% and 30% of the span of the leading edge 324. Some or all of the belly region 326 is disposed forwardly of a generally radial reference line 3RL. Reference line 3RL extends from a position on the root 322 that is a forward of the second point 3RL2 by a distance d/2.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A compressor of a gas turbine engine, comprising: a rotor rotatable about a center axis and a stator located immediately downstream of the rotor, the stator comprising a plurality of stator vanes each having an airfoil extending along a generally radial span between a root and a tip of the airfoil and having a chord with a chord length defined between a leading edge and a trailing edge of the airfoil, the airfoil having a radially inner portion defined by an inner approximately 40% of the span, a radially outer portion defined by an outer approximately 40% of the span, and an intermediate portion between the inner and outer portions, the leading edge having aerodynamic forward sweep throughout the radially inner portion, the forward sweep having a maximum forward sweep that is more forward than a sweep at the leading edge in the intermediate portion, an axial projection of the stator vane defined in an axial plane including the center axis, the stator vane having in the axial projection a leading edge belly region which extends forwardly of a reference line in the axial projection, the reference line extending between a first point defined at an intersection of the leading edge and the root, and a second point on the leading edge at 50% of the span.

2. The compressor as defined in claim 1, wherein the maximum forward sweep is disposed between 5% and 30% of the span.

3. The compressor as defined in claim 1, wherein the radially inner portion has aerodynamic dihedral at the leading edge, the leading edge dihedral being aft at the root of the airfoil.

4. The compressor as defined in claim 3, wherein the leading edge dihedral has a maximum aft dihedral at the root that is more aft than the dihedral in a remainder of the inner portion.

5. The compressor as defined in claim 1, wherein the belly region has an axial extent of between 5% and 30% of the chord length of the airfoil.

6. The compressor as defined in claim 1, wherein the belly region is defined between the root and 40% of the span.

7. The compressor as defined in claim 6, wherein the belly region is disposed between 10% and 20% of the span.

8. The compressor as defined in claim 1, wherein the maximum forward sweep is defined at the root.

9. The compressor as defined in claim 1, wherein the radially inner portion has aerodynamic forward sweep at the trailing edge, the forward sweep having a maximum forward sweep at the root.

10. The compressor as defined in claim 1, wherein the stator vane has in the axial projection a trailing edge belly region which extends forwardly of a reference line in the axial projection, the reference line extending between a first point defined at an intersection of the trailing edge and the root, and a second point on the trailing edge at 50% of the span.

11. The compressor as defined in claim 10, wherein the trailing edge belly region has an axial extent of between 5% and 30% of the chord length of the airfoil.

12. A gas turbine engine, comprising: a compressor with a rotor rotatable about a center axis and a stator located immediately downstream of the rotor, the stator comprising a plurality of stator vanes each having an airfoil extending along a generally radial span between a root and a tip of the airfoil and having a chord with a chord length defined between a leading edge and a trailing edge of the airfoil, the airfoil having a radially inner portion defined by an inner approximately 40% of the span, a radially outer portion defined by an outer approximately 40% of the span, and an intermediate portion between the inner and outer portions, the leading edge having aerodynamic forward sweep throughout the radially inner portion, the forward sweep having a maximum forward sweep that is more forward than a sweep at the leading edge in the intermediate portion, an axial projection of the stator vane defined in an axial plane including the center axis, the stator vane having in the axial projection a leading edge belly region which extends forwardly of a reference line in the axial projection, the reference line extending between a first point defined at an intersection of the leading edge and the root, and a second point on the leading edge at 50% of the span.

13. The gas turbine engine as defined in claim 12, wherein the maximum forward sweep is disposed between 5% and 30% of the span.

14. The gas turbine engine as defined in claim 12, wherein the radially inner portion has aerodynamic dihedral at the leading edge, the leading edge dihedral being aft at the root of the airfoil.

15. The gas turbine engine as defined in claim 12, wherein the belly region has an axial extent of between 5% and 30% of the chord length of the airfoil.

16. The gas turbine engine as defined in claim 12, wherein the belly region is defined between the root and 40% of the span.

17. The gas turbine engine as defined in claim 1, wherein the radially inner portion has aerodynamic forward sweep at the trailing edge, the forward sweep having a maximum aerodynamic forward sweep at the root.

18. A method of forming a stator vane, comprising:
providing an airfoil having a chord with a chord length and a generally radial span extending over a radially inner portion defined by an inner approximately 40% of the span, a radially outer portion defined by an outer approximately 40% of the span, and an intermediate portion between the inner and outer portions;
forming a leading edge of the airfoil having an aerodynamic forward sweep throughout the radially inner portion, the forward sweep having a maximum forward sweep that is more forward than a sweep at the leading edge in the intermediate portion; and
forming a leading edge belly region in an axial projection of the stator vane in an axial plane including a center axis, the leading edge belly region extending forwardly of a reference line in the axial projection, the reference line extending between a first point defined at an intersection of the leading edge and the root, and a second point on the leading edge at 50% of the span.

\* \* \* \* \*